July 19, 1949.  F. W. COFFING  2,476,838
MOTOR VEHICLE AND JACK LIFTING CONNECTION
Filed Oct. 30, 1944
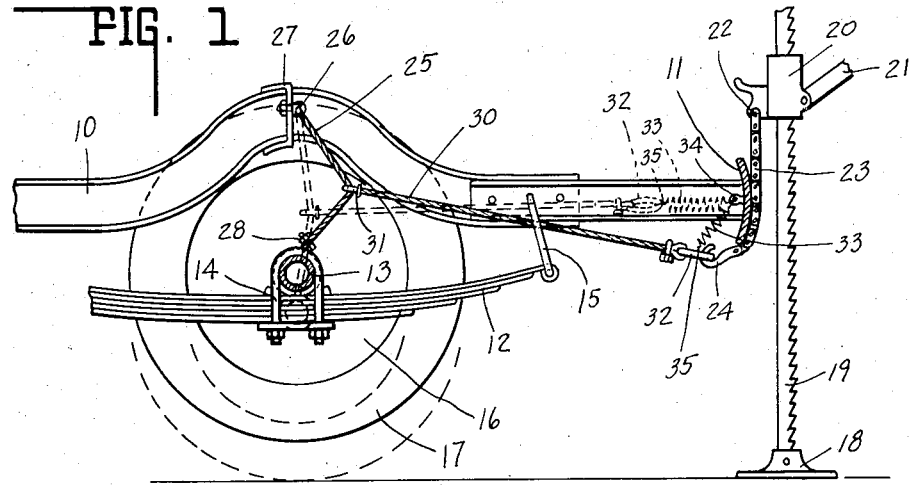
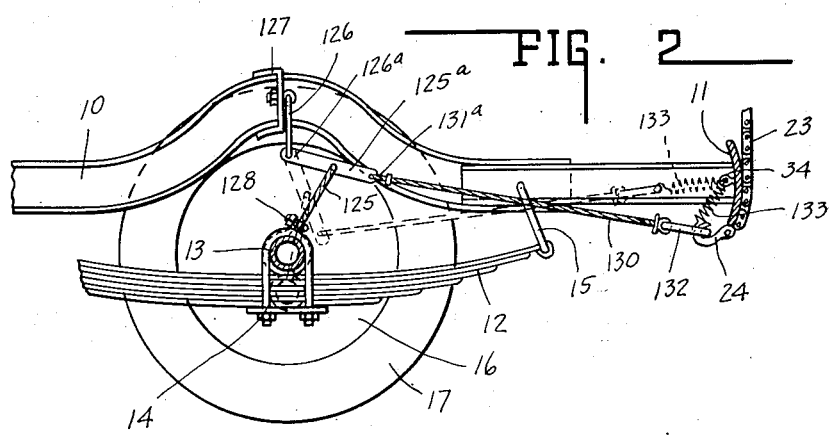
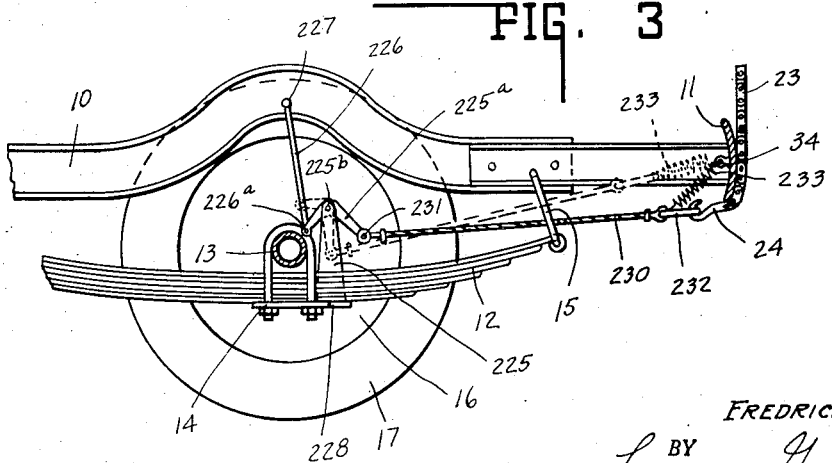
INVENTOR.
FREDRICK W. COFFING.
BY
Lockwood, Goldsmith & Galt.
ATTORNEYS.

Patented July 19, 1949

2,476,838

UNITED STATES PATENT OFFICE 2,476,838

MOTOR VEHICLE AND JACK LIFTING CONNECTION

Fredrick W. Coffing, Danville, Ill., assignor to Coffing Hoist Company, Danville, Ill., a corporation Application October 30, 1944, Serial No. 561,097

5 Claims. (Cl. 254—133)

1

This invention relates to a jack structure for motor vehicles.

This application is a continuation-in-part of the copending application, Serial No. 519,309, filed January 22, 1944, now Patent No. 2,378,836, dated June 19, 1945, in turn a continuation-in-part of the copending application, Serial No. 502,551, filed September 16, 1943, now Patent No. 2,378,835, dated June 19, 1945, each being entitled "Motor vehicle and jack lifting connection," and each made a part hereof for the problems therein disclosed and the several solutions thereof.

The present invention is directed to other solutions of all the problems recited in said copending applications and patents.

The chief object of the present invention is to provide means carried by the vehicle and which is of extremely simple character whereby through the instrumentality of an elevating member on a jack, an inextensible flexible means may be elevated to elevate one corner of a vehicle for wheel tire replacement, repair, etc., and initially preload the vehicle spring means to prevent complete unloading thereof normally requiring excessive elevation of the vehicle.

The chief feature of the present invention is to connect the frame and axle and/or a spring of the vehicle by a structure that normally does not inhibit normal relative movement therebetween, and which structure at an intermediate point between the frame and spring is connected to a tension member normally directed to and terminating adjacent the adjacent end of the vehicle, and yieldingly connected to that end for convenience, the latter connection, when desired, being of sufficient resistance to function as a shock absorber.

Other objects and features of the invention will be set forth more fully hereinafter.

The full nature of the invention will be understood from the accompanying drawing and the following description and claims:

In the drawings,

Fig. 1 is a side elevational view of the rear end of a vehicle, parts being shown elevated and the invention applied thereto and in the corresponding position, dotted lines indicating the parts in extended position.

Fig. 2 is a similar view of a modified form of the invention.

Fig. 3 is a similar view of a further modified form of the invention.

In Fig. 1 of the drawings, 10 indicates a vehicle frame to which is attached bumper 11.

2

12 indicates a vehicle spring secured to axle 13 at 14 and suitably connected at the remote (and herein rear) end as by shackle means 15. Axle 13 mounts wheel 16 having tire 17, all the aforesaid being of standard construction.

Associated with the aforesaid is a jack structure having base 18, standard 19, elevatable member 20 thereon, actuable by member 21. To member 20 is secured at 22 a flexible inextensible means 23 in the form of a chain. Herein same terminates in a hook 24. These same parts are similarly designated in Figs. 2 and 3.

All the aforesaid broadly is common to the disclosures of the copending applications. In Fig. 1 a flexible inextensible cable 25 is anchored at one end 26 to frame 10 by bracket 27, or an equivalent connection. The other end of cable 25 is similarly rigidly connected to the axle 13 as at 28.

Herein another flexible inextensible cable 30 is connected at 31 to an intermediate portion of cable 25 and extends therefrom toward the adjacent end of vehicle, passing, if desired, through shackle 15, and terminating in a loop or ring 32. A tension spring 33 herein is anchored at one end 34 to the bumper 11, or equivalent part of the vehicle, and its opposite end is permanently attached at 35 to ring 32, although this connection may be of snap-hook or other detachable type as desired.

Preferably in normal operation, spring 33 is extended and maintains cable 30 in tension and cable 25 taut but in angular position. For normal relative wheel and frame separation movement the cable 25 straightens out and spring 33 extends further, such extension serving to impose a shock absorbing action on the structure.

On rebound, as it were, spring 33 contracts and cable 25 assumes an angular position somewhat similar to that shown in full lines in Fig. 1. When the invention is to be operated, for wheel tire change or like purposes, hook 24 is engaged with ring 32 and thus member 20 of the jack is elevated on standard 19.

This immediately draws cable 30 toward the bumper 11 and hence the portions of the cable 25 assume a minimum angle position, see full lines Fig. 1, so that vehicle spring 12 is properly preloaded. This preloading prevents the axle moving away from the frame when the latter is elevated. Accordingly, the axle is raised as the member 20 and the frame is elevated. Hence, only a minimum total elevation is required for tire change, etc., purposes.

Upon effecting that change, etc., member 20 is lowered until tire 17 engages the ground. Then hook 24 is disengaged from ring 32 and cable 30, instead of dropping and dangling, is held slightly tensioned and elevated as indicated by the dotted lines in Fig. 1.

The simplicity of the members required over that illustrated in the copending applications will be obvious from the foregoing, despite the general basic similarities.

In Fig. 2 a cable 125 is anchored at one end to axle 13 as at 128. Its opposite end is connected to rigid member 125a intermediate the ends thereof. One end 126a is connected by link 126 suported by bracket 127 to the frame 10. Cable 130 with ring 132 at the remote end is tensioned by spring 133 and is connected at its opposite end 131a to the other end of rigid member 125a.

The operation of this form of the invention is substantially that previously described, except that member 125a under elevation tensioning force applied at ring 132 tilts about the pivotal axis coincident with end 126a and link 126 swings counterclockwise.

In Fig. 3 a still further embodiment is illustrated. Herein link rod 226 is pivoted on the frame 10 at 227. A bracket 225 is carried by plate 228 secured to the spring 12 as illustrated. A bell crank 225a is pivoted at 225b on bracket 225. One end is connected at 226a to link 226. The other end is connected at 231 to cable 20 terminating in ring or loop 232, spring anchored as at 233 to the bumper 11.

The operation of this form is similar to the preceding form. Elevational tensioning force tilts bell crank 225a to hold the frame and wheel together to retain spring 19 preloaded as before and further force applied elevates same simultaneously.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

This invention relates to:

1. A lifting structure for vehicles having a frame including a side and an end portion, a wheel support member, and spring means connecting the support member to the frame, said lifting structure comprising means permanently connected at one end to the frame and permanently at the opposite end to the support member and spring means, and tensioned means connected at one end to the second mentioned means intermediate the ends thereof and having its other end positioned adjacent the frame end portion, and means juxtapositioned to the frame end, slightly beyond same and operatively bearing thereon and connectible to the tensioned means immediately adjacent the frame end thereof for tensioning said tensioned means, initial tensioning causing portions of the second mentioned means to assume different relative positions for preventing undue separation of the frame and support member upon frame elevation and subsequent tensioning causing simultaneous elevation of the frame and support member.

2. A lifting structure for vehicles having a frame including a side and an end portion, a wheel support member, and spring means connecting the support member to the frame, said lifting structure comprising means connected at one end to the frame and at the opposite end to the support member and spring means, and tensioned means connected at one end to the second mentioned means intermediate the ends thereof and having its other end positioned adjacent the frame end portion, and means juxtapositioned to the frame end and connectible to the tensioned means adjacent the frame end thereof for tensioning said tensioned means, initial tensioning causing portions of the second mentioned means to assume different relative positions for preventing undue separation of the frame and support member upon frame elevation, and subsequent tensioning causing simultaneous elevation of the frame and support member, the second mentioned means comprising a cable, the tensioned means being connected at one end to said cable intermediate the ends thereof.

3. A lifting structure for vehicles having a frame including a side and an end portion, a wheel support member, and spring means connecting the support member to the frame, said lifting structure comprising means connected at one end to the frame and at the opposite end to the support member and spring means, and tensioned means connected at one end to the second mentioned means intermediate the ends thereof and having its other end positioned adjacent the frame end portion, and means juxtapositioned to the frame end and connectible to the tensioned means adjacent the frame end thereof for tensioning said tensioned means, initial tensioning causing portions of the second mentioned means to assume different relative positions for preventing undue separation of the frame and support member upon frame elevation, and subsequent tensioning causing simultaneous elevation of the frame and support member, the second mentioned means comprising a rigid member, a link, the link and member having end to end pivotal connection, and a cable connected at one end to the rigid member between the ends thereof, the remote ends of the link and cable being connected as defined for said second mentioned means and said tensioned means being connected to the other end of the rigid member.

4. A lifting structure for vehicles having a frame including a side and an end portion, a wheel support member, and spring means connecting the support member to the frame, said lifting structure comprising means connected at one end to the frame and at the opposite end to the support member and spring means, and tensioned means connected at one end to the second mentioned means intermediate the ends thereof and having its other end positioned adjacent the frame end portion, and means juxtapositioned to the frame end and connectible to the tensioned means adjacent the frame end thereof for tensioning said tensioned means, initial tensioning causing portions of the second mentioned means to assume different relative positions for preventing undue separation of the frame and support member upon frame elevation, and subsequent tensioning causing simultaneous elevation of the frame and support member, the second mentioned means including a link, a bell crank and a bracket, the link being connected to one arm of the bell crank, the latter being pivotally supported by the bracket, the remote ends of the link and bracket being connected as defined for said second mentioned means and said tensioned means being connected to the other arm of the bell crank.

5. A lifting structure for vehicles having a frame including a side and an end portion, a wheel support member, and spring means connecting the support member to the frame, said lifting structure comprising means connected at one end to the frame and at the opposite end to the support member and spring means, and tensioned means connected at one end to the second mentioned means intermediate the ends thereof and having its other end positioned adjacent the frame end portion, and means juxtapositioned to the frame end and connectible to the tensioned means adjacent the frame end thereof for tensioning said tensioned means, initial tensioning causing portions of the second mentioned means to assume different relative positions for preventing undue separation of the frame and support member upon frame elevation, and subsequent tensioning causing simultaneous elevation of the frame and support member, a tensioning tie constantly connecting the frame and juxtapositioned end of the tensioning means to the adjacent end of the vehicle, the tensioning tie being relieved of tension when the support member and frame are initially caused to approach each other and when the support member, spring means and frame are simultaneously elevated by the subsequent tensioning of the third mentioned means by the fourth mentioned juxtapositioned means.

FREDRICK W. COFFING.

REFERENCES CITED

The following references are of record in the file of this patent:

UNITED STATES PATENTS

| Number | Name | Date |
| --- | --- | --- |
| 1,782,400 | Bolard | Nov. 25, 1930 |
| 1,992,519 | Chryst | Feb. 26, 1935 |
| 2,009,632 | Bramley-Moore | July 30, 1935 |
| 2,092,719 | Ryerson | Sept. 7, 1937 |